United States Patent [19]
Schittek et al.

[11] 3,910,118
[45] Oct. 7, 1975

[54] PROBE FOR CONTROLLING THE LEVEL OF ELECTRICALLY CONDUCTIVE LIQUIDS

[75] Inventors: Friedrich Schittek; Heino Zimmermann, both of Bremen, Germany

[73] Assignee: Gustav F. Gerdts KG, Bremen, Germany

[22] Filed: Jan. 18, 1974

[21] Appl. No.: 434,706

Related U.S. Application Data
[63] Continuation-in-part of Ser. No. 327,026, Jan. 26, 1973, abandoned.

[30] Foreign Application Priority Data
Feb. 2, 1972   Germany............................ 2204805

[52] U.S. Cl. .......... 73/304 R; 324/65 P; 340/244 C
[51] Int. Cl.² ........................................ G01F 23/22
[58] Field of Search .............. 73/304 R, 304 C, 313; 340/244 C; 324/65 R, 65 P

[56] References Cited
UNITED STATES PATENTS

| | | | |
|---|---|---|---|
| 833,207 | 10/1906 | Frank............................ | 73/304 R X |
| 838,823 | 12/1906 | Thomson ........................ | 340/244 C |
| 2,201,542 | 5/1940 | Kinderman ........................... | 73/330 |
| 2,461,111 | 2/1949 | Flinspach et al.................. | 324/65 R |
| 2,470,510 | 5/1949 | Matson et al. ..................... | 73/304 R |
| 2,551,983 | 5/1951 | Wagner............................. | 73/304 R |
| 3,339,411 | 9/1967 | Riffle .............................. | 73/304 R |
| 3,548,304 | 12/1970 | Lohnes.......................... | 324/65 R X |
| 3,555,533 | 1/1971 | Edelman............................ | 73/304 R |

*Primary Examiner*—Richard C. Queisser
*Assistant Examiner*—Daniel M. Yasich
*Attorney, Agent, or Firm*—Allison C. Collard

[57] ABSTRACT

In a device or probe for controlling the level of electrically conductive liquids in a container having an electrode rod, an insulating body comprising a plurality of mica disks surrounding the electrode rod, and intermediate distance spacers also surrounding the electrode disposed between the links. The disks and spacers are mounted in the container between the separating wall and the electrode.

5 Claims, 4 Drawing Figures

PROBE FOR CONTROLLING THE LEVEL OF ELECTRICALLY CONDUCTIVE LIQUIDS

This is a continuation-in-part application of application Ser. No. 327,026 filed on Jan. 26, 1973 and now abandoned.

The present invention relates to a probe for controlling the level of electrically conductive liquids. Such liquids are usually disposed in a container having an electrode rod fastened thereto in a bore provided in the container wall. The electrode extends through a separating wall of a fastening means, or housing. An insulating body is provided on the electrode in the area in which it protrudes the separating wall to insulate the electrode from the housing or fastening means and to seal the area of protruding so as to be liquid and pressure tight.

Conventional insulating bodies for such electrodes generally comprise jackets made of ceramic or porcelain material, since these materials have very good pressure and temperature resistance characteristics. By lengthening, the jackets for the required "path of travel" against surface leakage current from the electrode to the housing can be realized. The "path of travel" is commonly known as the shortest path of the non-conductive insulator upperface disposed between the electrode and the fastening means or the container wall, respectively. When the above-mentioned insulating materials are used in alkaline liquids, they are damaged by the liquid in a relatively short period of time. When this happens, the liquid may penetrate the insulating material and reach the electrode. This causes an incorrect signal to be given indicating the level of the liquid. Furthermore, a secure seal between the electrode and the container wall is no longer provided, and the electrodes become unsafe to operate. To combat these problems, insulating jackets constructed of resistant plastic material were used. However, jackets made of plastic material are only suitable for low operating temperatures and pressures. This is because plastic materials soften very easily. Reference to these prior art devices is made in German Utility Model Registrations 1,879,482; 6,750,202; and German Patent No. 1,648,163.

It is therefore an object of the present invention to provide a device with an electrical insulating jacket which may be used in alkaline liquids under high operating pressures and at high temperatures.

Accordingly, the present invention provides an electrical insulating body which consists of a plurality of mica disks which surround the electrode rod, and intermediate distance spacers insulatedly also surrounding the electrode and disposed between the mica disks. The mica disks and the distance spacers are clamped inbetween the separating wall of the container and an axial supporting surface at the electrode rod.

Mica is very well known in the electrical field as a good insulating material which is resistant to alkaline liquids. However, the material is not available as insulating jackets for disposal over electrodes, but is only available in powder or disk form. Therefore, in order to provide the prescribed travel path mentioned above, the disks must have large radial diameters. Due to the low bending resistant of the mica material, it is very often damaged when installed, or when pulsated by the liquid whose level is being controlled. Furthermore, an insulating body constructed from such disks provides an undesirable and awkward design. For these reasons, mica has never been used as an insulating material for electrodes despite its good chemical resistance characteristics.

The present invention, however, now makes it possible to use mica as an insulating material for electrical probes which control the level of a liquid. The insulating face, and therefore, the travel path of the insulating body is formed by the radial extension of a plurality of mica disks. The disks are mounted in series on the electrode rod and are spaced apart by distance spacers. The distance spacers surround the electrode rod and are electrically conductive. The mica discs also function as washers in the probe structure. The diameter of the mica disks of the present invention may be less in diameter than conventional disk structures since the travel path can be changed by varying the number of disks used. Metal jackets may be used as distance spacers, since their resistance to damage by alkaline liquids is as good as mica. The distance spacers surround the electrode rod so as to provide an annular space therebetween which insulates the upper face of the electrode rod from the spacers. The probe of the present invention is highly reliable and efficient in operation and has a compact inexpensive construction.

Another embodiment of the present invention provides a correct liquid level indication if the insulating body should be damaged, for example, during installation, or as a result of insulating material damage. This embodiment ensures a high operational safety standard. To achieve this, a control electrode is disposed in the annular spaces between the electrode rod and the distance spacers, or one of the distance spacers not disposed in the space between may be used as the control electrode. The control electrode and the electrode rod are coupled to an indicating means of the probe or device. When the insulating body is in good condition, the annular space around the electrode rod is free of liquid, and no electrical connection between the two electrodes is provided in the annular space. However, when the insulating body is not liquid-tight, and liquid leaks from the container into the annular spaces around the electrode rod, the two electrodes now are electrically coupled, and the change in electrical resistance triggers a leak warning signal in (by) the indicating means.

The annular spaces around the electrode rod are preferably filled with salt. When it is dry, the salt forms an electrical insulator, when it is damp or wet, it forms a low impedence resistor between the two electrodes as a result of ion formation, thus sending a very strong pulse signal when leaking occurs.

In conventional electrodes, the precipitation of a wet film on the insulating body causes a resistance change between the electrode rod and the counter electrode, for example, the wall of the container, thus erroneously cause a liquid level reading although the electrode is not in contact with the liquid in the container. The number of such incorrect readings is supposedly controlled in wet devices by providing a long travel path on the insulating body. However, erroneous readings cannot be completely eliminated by such a method. Furthermore, the indicating signal pulses in conventional devices are greatly influenced by the electrical conductivity of the liquid in which the electrode is disposed. Conventional probes thus have to be adjusted to compensate for the conductivity of the controlled liquids.

These disadvantages are completely eliminated by the present invention. The distance spacer compensating electrode is coupled to a bridge circuit to which the electrode rod is coupled too for controlling the liquid level. A wet film precipitated on the compensating electrode and mica disks causes a change in the bridge circuit diagonal, which is opposite to the liquid level signal.

The compensating electrode on the one hand forms a resistance in (common with) the liquid in the container with respect to a ground electrode and on the other hand forms a resistance (path) in (common with) the wet film in respect to the electrode rod. Both these resistance paths form resistors in a first branch of the bridge circuit. Furthermore, the electrode rod forms a resistance path in (common with) the liquid in the container in respect to the counter electrode. The latter resistance path forms a resistor in a second branch of the bridge circuit. The two branches are switched (coupled) in series with respect to the power source of the bridge circuit; meaning shall be: First branch coupled to a first terminal of the power source and to a first terminal of the bridge diagonal. Second branch coupled to the first terminal of the bridge diagonal and to the second terminal of the power source in respect to the power source of the bridge circuit. As a result, a wet film on the insulating body does not cause a liquid level indication signal. This is because the electrode rod and the annular control electrode oppositely influence the electrical measuring system, and when the liquid level is measured, i.e., when both electrodes are disposed in liquid, the conductivity of the water is eliminated as a measuring factor, and the measuring system does not have to be adjusted. The liquid level indicating signal is determined only by the ratio of the two electrode resistors. The counter electrode is arranged in a defined distance from the annular compensating electrode and the electrode rod. As a result, the insulation or the resistor paths, respectively, are defined exactly between the electrode rod and the counter electrode and between the compensating electrode and the counter electrode, and the local installation conditions in the container do not have any influence on the indication value. The counter electrode may be a pipe which coaxially surrounds the insulating body and the electrode rod. It should be noted that the inventive features relating to the self control of the probe, as well as the elimination of the conductivity or wet film influences from the liquid level signal, are not produced only by the use of mica disks, and any other suitable material may be used.

Other novel aspects and features of the present invention will become apparent from the following detailed description when taken in conjunction with the accompanying drawings which disclose a preferred embodiment of the invention. It is to be understood, however, that the drawings are designed for the purpose of illustration only, and are not intended as a definition of the limits and scope of the invention.

In the drawings wherein similar reference characters denote similar elements throughout the several views.

Figure 1:
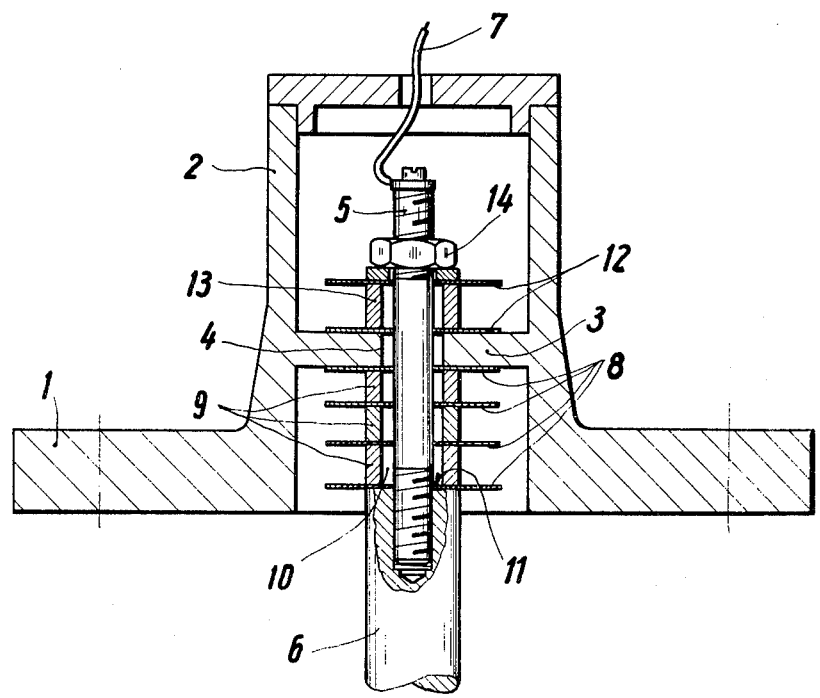
FIG. 1 is a cross-sectional view of the probe for controlling the level of electrically conductive liquids constructed in accordance with the present invention.

Referring to FIG. 1, there is shown the fastening means for the probe in the container (not shown) having a flange 1 defining a pipe socket 2 which is disposed away from the container. A separating wall 3 is provided within pipe socket 2 and includes a bore 4. An electrode rod consists of two portions 5 and 6. Electrode portion 5 is threadably engaged to the other electrode portion 6, which has a larger diameter than portion 5, and is disposed through the separating wall. An insulating annular space is disposed between the wall of bore 4 and the electrode face. An electrical conductor 7 is connected to the end of electrode portion 5.

A plurality of mica disks 8 are mounted over the electrode portion 5. These disks are mounted between metal distance spacers 9. An insulating annular space 10 is formed between annular distance spacers 9 and electrode portion 5. Distance spacers 9 are electrically insulated from each other by the disks 8. The disks and the distance spacers are clamped inbetween separating wall 3 and axial support face 11 of the thicker portion 6 of electrode rod, whereby the disks also serve as washers. The insulation of the free end of electrode portion 5 is effected by the mica disks 12 and an intermediate distance spacer 13. However, other materials which are not resistant to alkaline liquids may be used here since these insulating bodies are disposed outside the container, i.e., outside of contact with the alkaline liquid. Parts 3, 6, 8, 9, 12 and 13 are tightly secured together by a nut 14 which is mounted on electrode portion 5.

Mica disks 8 and 12 are connnected in series with their insulating effect. An electric surface leakage current due to wet disks has to travel from electrode portion 6 at the lowermost mica disk 8 from the underside of the disk, radially around to the upper side of the disk, and then from the lowermost distance spacer 9 to the next highest mica disk, etc., upwardly, until it reaches separating wall 3. The total effective insulating surface between the electrode and separating wall, and therefore the travel path for the surface leakage current is the summation from the addition of the radial extensions of mica disks 8 and 12, respectively. Since disks 8 and the metal distance spacers are resistant to damage by alkaline liquids, a secure insulating for the probe is provided, and the "travel path" can be varied by changing the number of disks used.

Figure 2:
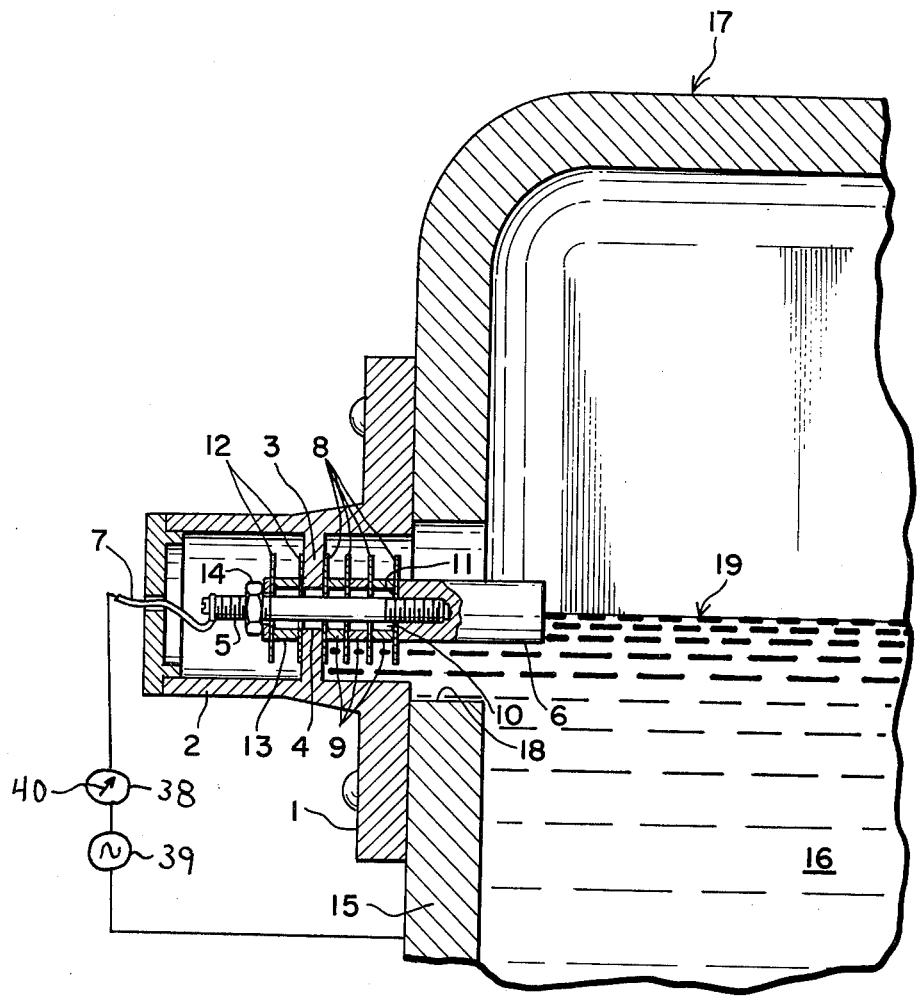
FIG. 2 is a cross-sectional view showing the probe of FIG. 1 attached to the side wall of a liquid container.

FIG. 2 shows the mounting of the probe of FIG. 1 on a sidewall 15 of container 17 which is filled with an electrically conductive liquid 16. For this purpose, sidewall 15 is provided with a bore 18 through which electrode portion 6 of the probe extends into the interior of the container and senses the level 19 of liquid 16. The conductor 7 from the electrode portion 5 leads into a meter 38 for indicating level 19. The meter is connected to one terminal of an AC voltage source 39 while the other terminal of the source 39 is connected to the container wall 15 which acts as a counter electrode to the electrode 6.

As long as the level 19 of liquid 16 is below the electrode portion 6, there is no electrical connection between the electrode 6 and the container wall 15 (i.e., there exists a very high electrical resistance between the electrode 6 and the container wall 15). Accordingly, in the container, no current flows from electrode 6 to wall 15 and there is no deflection of the pointer 40 of the meter 38. That means: desired level not reached yet.

When the desired level 19 is obtained, that is, when the liquid 16 contacts the electrode portion 6, as shown in FIG. 2, a high electrical conductivity is attained between the electrode 6 and the container wall 15 due to the low electrical resistance of the liquid 16. Therefore, a strong flow of current takes place through meter 38 and further from electrode portion 6 to wall 15. This causes a deflection of the pointer 40 or a triggering of alarm contacts of the meter 38 and is the signal: desired level is obtained.

Instead of being mounted on the sidewall 15 of the container 17, the probe may as well be mounted on the top of the container. In this case, the electrode portion 6 extends down vertically up to the desired and to the detected level 19 of liquid 16.

Figure 3:
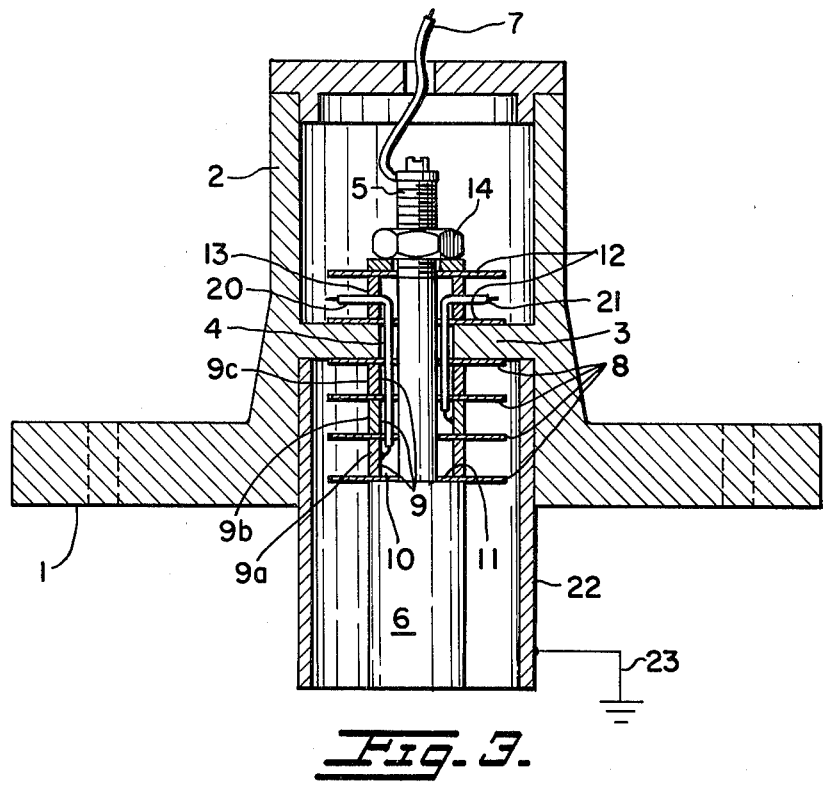
FIG. 3 is a cross-sectional view of another embodiment of a probe.

FIG. 3 is a detailed view of another embodiment of the probe. Of the three metallic electrically conductive distance spacers 9a - c, the lower distance spacer 9a is a compensation ring electrode, and is connected to an electrical conductor 20. The intermediary distance spacer 9b is a control ring electrode, and is connected to an electrical conductor 21. The probe is also provided with a pipe which is the counter electrode 22, so that the pipe coaxially encompasses electrode portion 6 as well as distance spacers 9a - c, and is connected to ground 23. The radial distance between the distance spacer 9a and the counter electrode 22 is quite the same as the radial distance between the electrode portion 6 and the counter electrode 22. For use, the probe of FIG. 3 may be installed as shown in FIG. 2. Besides it is connected to an electrical circuitry as shown in FIG. 4.

Figure 4:
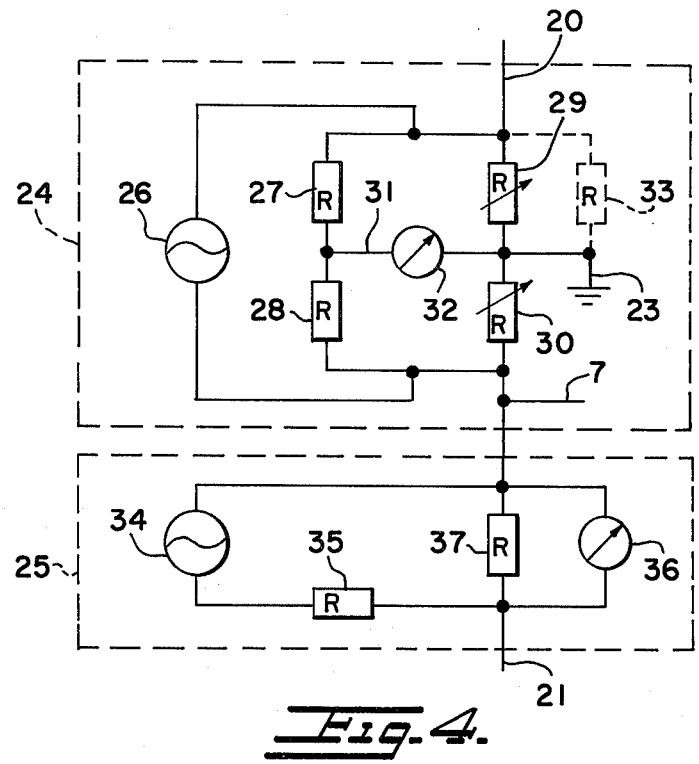
FIG. 4 is an electrical schematic diagram of the bridge circuits which are connected to the probe of FIG. 3 for detecting the liquid level.

FIG. 4 is a schematic diagram of the electrical circuitry with two measuring circuits 24 and 25 for the probe of FIG. 3. The probe is connected to the top of this circuitry by the electrical conductor 20, to the right by the conductor 7 and the ground 23 and from below by the conductor 21. The connection between circuitry and probe is not shown completely but symbolized by the short ends of conductors in the circuitry with the same numerals as in FIG. 3. Measuring circuit 24 is provided with a resistance bridge circuit which is fed by an AC voltage source 26. Fixed resistors 27 and 28 are provided in the two left side bridge branches, while resistors 29 and 30, in the two right side bridge branches are variable. Resistor 30 is the electrical resistance between electrode portion 6 and counter electrode 22, while resistor 29 is the electrical resistance from distance spacer 9a to counter electrode 22.

When the probe is dry and not submerged, there is neither an electrical connection between electrode portion 6 and counter electrode 22 nor between distance spacer 9a and counter electrode 22. Accordingly, the resistors 29 and 30 are very high and practically equal and the resistor bridge of resistor circuit 24 is balanced. When electrode portion 6 and compensation ring electrode 9a are submerged into the liquid to be controlled, two resulting low resistances 29 and 30 are obtained between electrodes 6 and 9a, respectively, and counter electrode 22 because of the electrical conductivity of the liquid 16. As both electrodes 6 and 9a are submerged into the same liquid 16 and the resistance 29 is effective in a first bridge branch and resistor 30 is effective in a second bridge branch, and these two bridge branches are connected in series with respect to the voltage source 26, only the ratio of the two resistances is decisive for measurement but not their real value. The ratio is defined by the measurements of electrodes 6 and 9a, i.e., by the different lengths of the electrodes because their radial distance to the counter electrode 22 is equal. Thus, the conductivity of the liquid is eliminated from the readings.

For example, in the submerged condition, resistance 30 between electrode portion 6 and counter electrode 22 is much less than the resistance 29 between compensation ring electrode 9a and counter electrode 22. Consequently, there is strong mistuning of the bridge diagonal 31, which is read by indicator element 32 as "submerged," i.e., the desired liquid level is obtained. If, after the probe is removed from the liquid and a wet film is still present on mica disks 8 as well as on distance spacers 9a - c, this liquid then acts in the bridge circuit as an additional resistor 33 in parallel to resistor 29. In the removed condition of electrode portion 6, the resistors 29 and 30 are very high and practically equal, as before mentioned, and the additional resistor 33 causes a counter mistuning of the measuring bridge with respect to the submerged condition. Therefore, this liquid film residue cannot simulate the "submerged" condition.

The measuring circuit 25 serves to indicate leaks on the distance spacers 9a - c and mica disks 8. For this purpose, an electric indicator or meter 36 is provided and connected to an AC voltage source 34 in addition to fixed resistor 35, so as to limit the current. Furthermore, in this circuit, the electrical resistance of control ring electrode 9b to electrode portion 5 is switched parallel to indicator means 36 and shown by resistor 37.

When the annular space 10 of the probe is free of liquid, the resistance 37 of control ring electrode 9b to electrode portion 5 is very high. Therefore, no current flows from electrode portion 5 to control ring electrode 9b so as not to change meter 36. However, if liquid from the container penetrates into annular space 10 due to a leakage between mica disks 8 and distance spacers 9a - c, resistance 37 of control ring electrode 9b to electrode portion 5 decreases to a minimum. Consequently, a high current flows in circuit 25 so as to change indicator 36 which then signals "trouble".

Although the operation of the probe is explained with reference to two measuring circuits, the function of the control electrode and the compensation electrode may be carried out by one single distance spacer so that the "trouble" signal would be triggered by circuit 24, and circuit 25 is eliminated.

What is claimed is:

1. A probe for detecting the level of electrically conductive liquids in a container comprising:

a measuring electrode rod;

a housing for mounting said electrode rod to the wall of said container, said electrode rod extending through a wall of said housing into said container;

a plurality of spaced-apart insulating discs radially surrounding said electrode rod;

a plurality of annular and conductive distance spacers insulatedly surrounding said electrode rod and disposed between said insulating discs, said insulating discs and said distance spacers being secured inside the container so as to seal and insulate said electrode rod from said housing;

an electrical bridge circuit coupled to said electrode and housing for liquid level indication; and a counter electrode arranged at a defined distance from said electrode rod and said distance spacers, wherein one of said distance spacers comprises a compensating electrode forming a resistance path common with the liquid of the container with respect to the counter electrode, said resistance path serves as a resistor in one branch of the bridge circuit and the resistance path between said electrode rod and said counter electrode serves as a resistor in another branch of the bridge circuit and said two branches are connected in series to each other with respect to a power source coupled to the bridge circuit.

2. The probe as recited in claim 1 wherein said distance spacers define annular gaps around the electrode rod; and comprising a control electrode disposed between said electrode rod and said discs, and indicating means coupled to said control electrode on the one hand and to said electrode rod on the other hand for indicating changes in electrical resistance in said annular gaps around said electrode rod.

3. The probe as recited in claim 2 wherein one of said distance spacers comprises said control electrode.

4. A probe for detecting the level of electrically conductive liquids in a container comprising:

a measuring electrode rod;

a housing for mounting said electrode rod to the wall of said container, said electrode rod extending through a separation wall of said housing into said container;

a plurality of spaced-apart insulating discs radially surrounding said electrode rod;

at least one annular and conductive distance spacer insulatedly surrounding said electrode rod and disposed between said insulating discs, said insulating discs and said distance spacer being secured inside the container and an axial support face of said electrode rod so as to seal and insulate said electrode rod from said housing;

an electrical bridge circuit coupled to said electrode and housing for liquid level indication;

a counter electrode spaced from said electrode rod and said at least one distance spacer; wherein one of said at least one distance spacer comprises a compensating electrode forming a resistance path common with the liquid of the container with respect to the counter electrode, said resistance path serves as a resistor in one branch of the bridge circuit, and a path of resistance between said electrode rod and said counter electrode serves as a resistor in another branch of the bridge circuit; and a power source coupled to said bridge circuit and across said two branches, the latter connected in series to each other with respect to said power source.

5. The probe as recited in claim 4 wherein said at least one distance spacer constitutes a plurality of distance spacers;

said electrode rod includes a smaller diameter portion and a larger diameter portion connected to each other through said separating wall, said smaller diameter portion being spaced from said plurality of distance spacers; and said counter electrode and said compensating electrode are horizontally installed through a vertical wall of said housing.

* * * * *